July 21, 1942.　　W. BRAUER　　2,290,735
AUTOMATIC CATHEAD
Filed March 20, 1939　　5 Sheets-Sheet 1
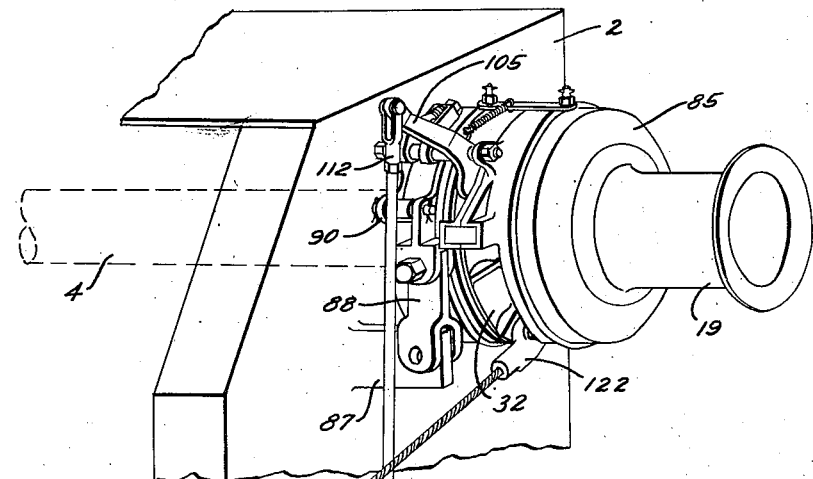
Fig. 1
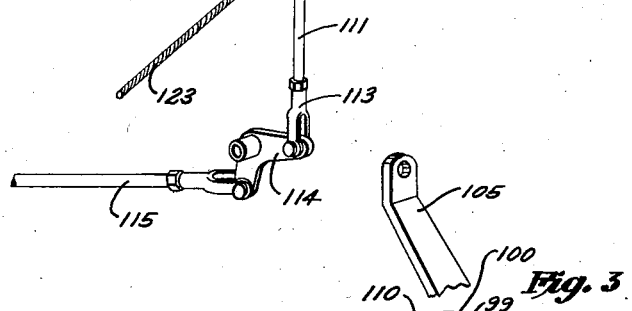
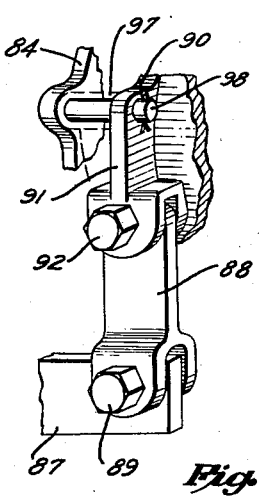
Fig. 2
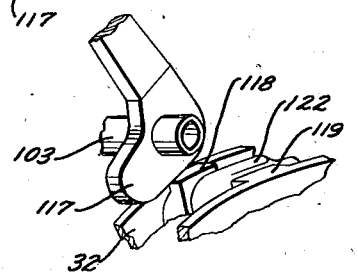
Fig. 4
INVENTOR
*Walter Brauer*
BY *Barry & Cyr*
ATTORNEYS

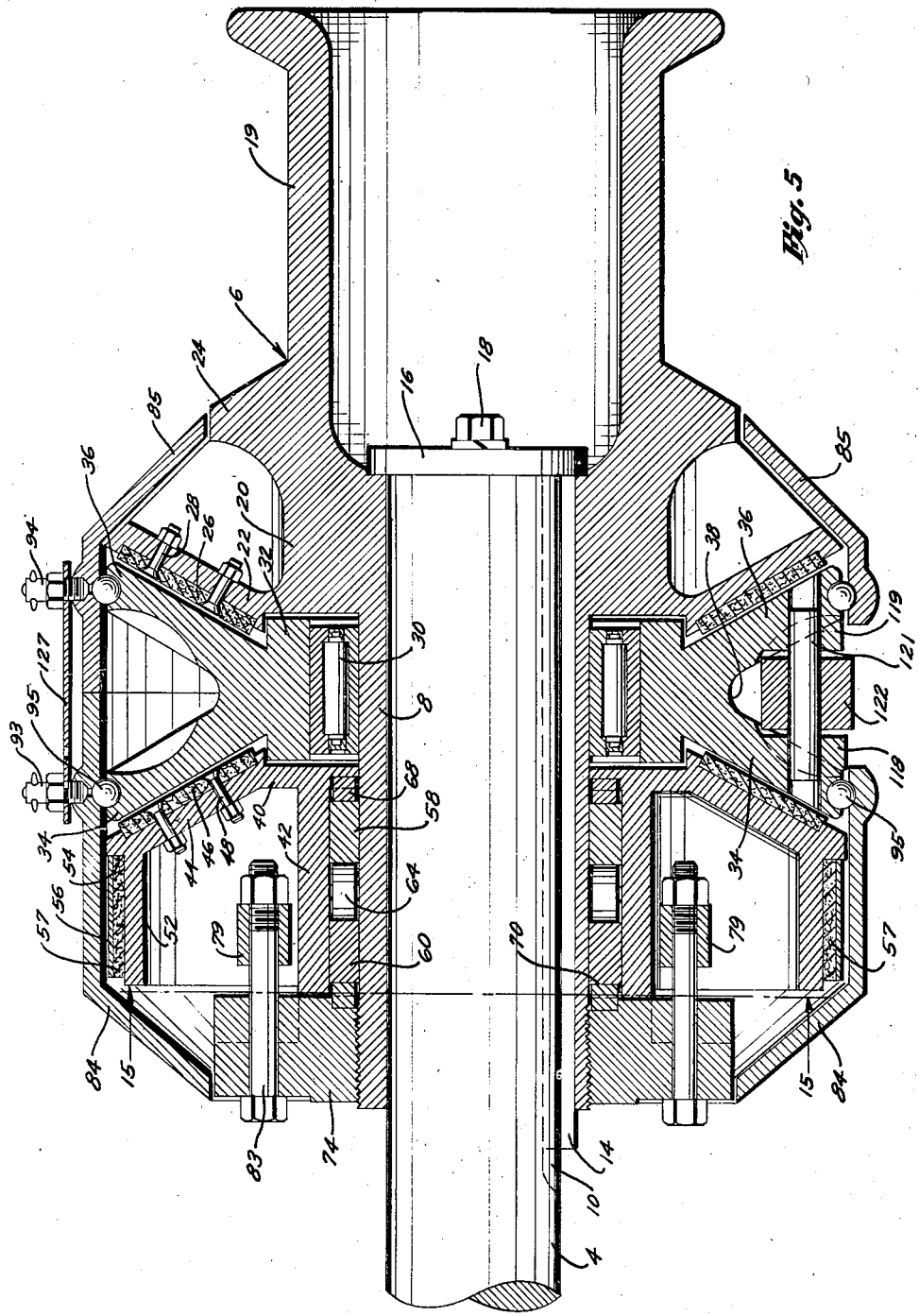

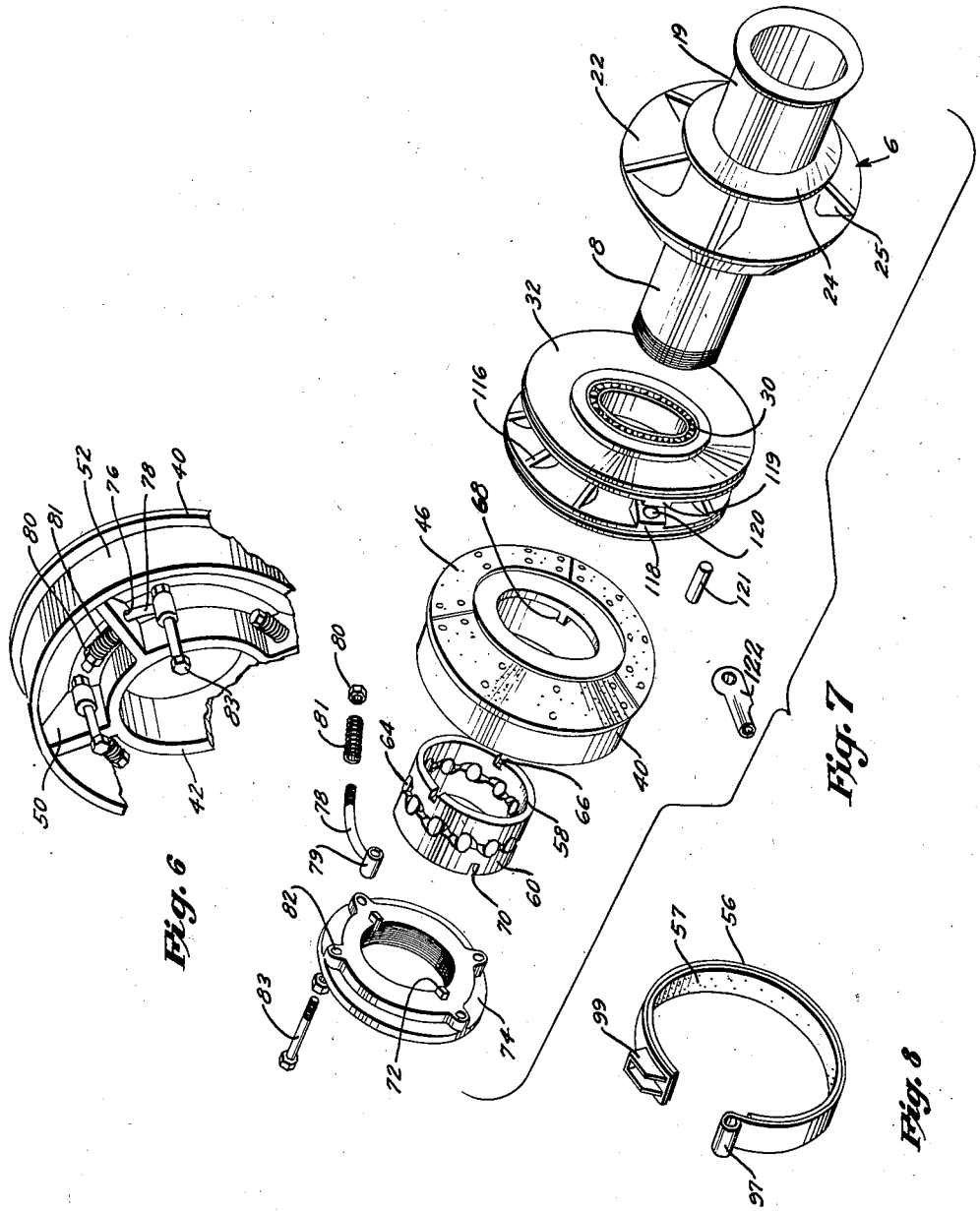

July 21, 1942.  W. BRAUER  2,290,735
AUTOMATIC CATHEAD
Filed March 20, 1939   5 Sheets-Sheet 4

INVENTOR
*Walter Brauer*
BY *Barry & Cyr*
ATTORNEYS

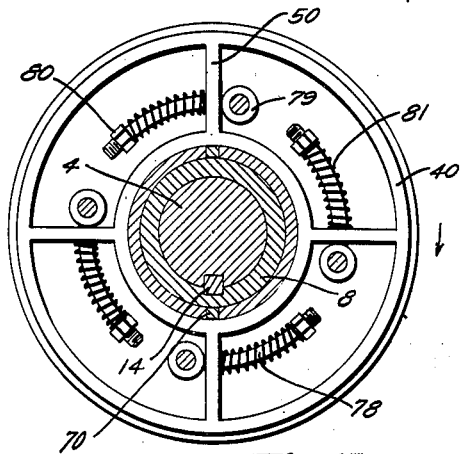
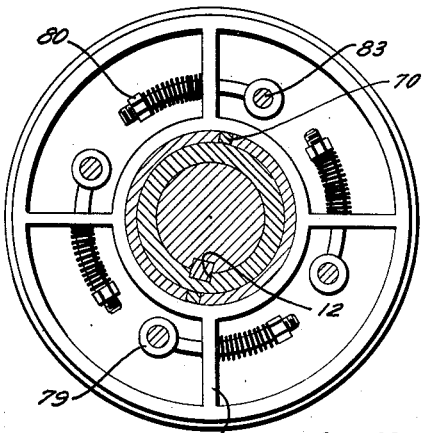
Fig. 15  Fig. 18
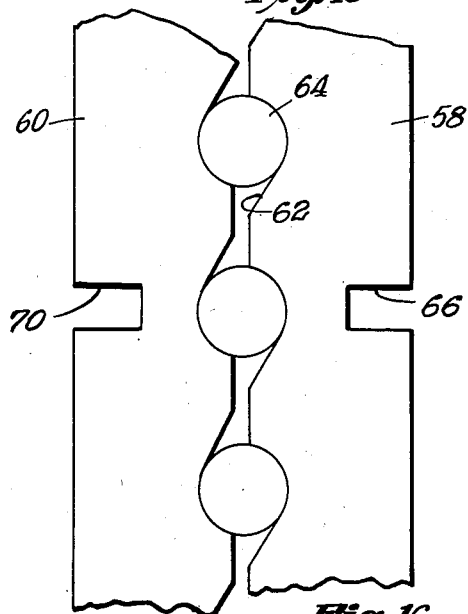
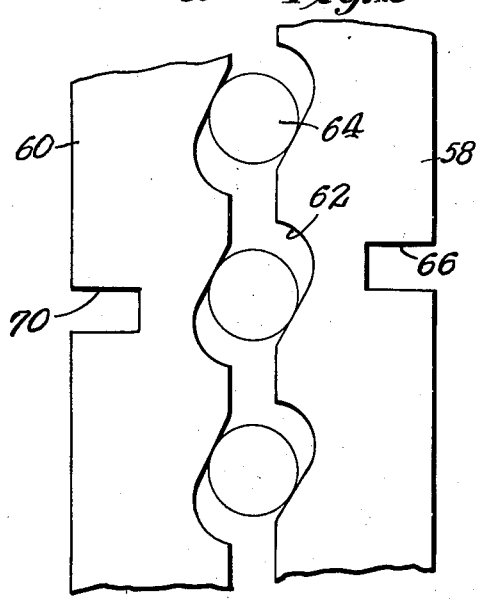
Fig. 16  Fig. 19
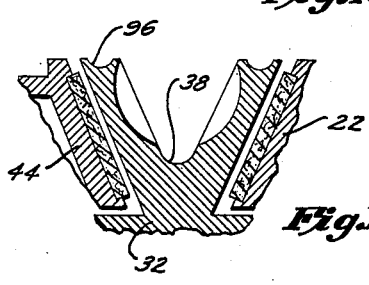
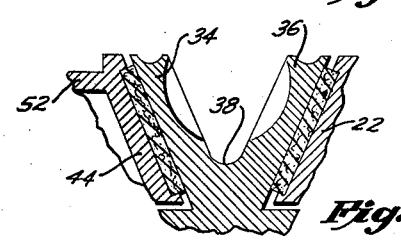
Fig. 17  Fig. 20
INVENTOR
*Walter Brauer*
BY *Barry & Ayr*
ATTORNEYS

Patented July 21, 1942

2,290,735

UNITED STATES PATENT OFFICE 2,290,735

AUTOMATIC CATHEAD

Walter Brauer, Oklahoma City, Okla.

Application March 20, 1939, Serial No. 262,979

12 Claims. (Cl. 254—173)

This invention relates to rotary draw works for the drilling of an oil well and more particularly, but not by way of limitation, to an automatic friction clutch or cat head cooperating with the draw works for operating a cable or pull line used for connecting and disconnecting the drill pipe sections of the well.

In the drilling of an oil well with a rotary draw works the sections of the drill pipe are frequently screwed together and taken apart, especially the sections of drill pipe operating the drill bits, and it has been conventional practice to make up and break up the drill pipe by winding a pull line about the line shaft spool of the rotary draw works, and then about the drill pipe joint to frictionally urge the pipe to rotate simultaneously with the rotation of the spool. This practice has been further augmented by the utilization of an automatic cat head for automatically controlling the operation of the pull line on the drill pipe. It has been found that in the present day automatic cat heads once they are engaged they must go to the full length of their rotation before reversing, unless the draw works engine is stopped and reversed. Furthermore, in present day automatic cat heads, one end of the cable or pull line is usually secured in a socket of the sheave groove, and in a backing up operation for tightening joints or the like on the drill collar and pipe, the sheave is subjected to a reverse pull. In a solid connection for the pull line and sheave when the pull or load is unusually heavy, the rotation of the sheave to the bottom of the cat head housing will place a tremendous strain on the housing, consequently the housing must be strongly secured by a plurality of bolts or the like to the draw works. However, it has been found that this strain sometimes becomes great enough to shear off the bolts securing the cat head housing to the draw works.

It is therefore a principal object of this invention to provide an improved clutch mechanism in a cat head for a rotary draw works for automatically controlling the operation of the pull line actuating the drill pipe.

A further object of this invention is to provide a clutch mechanism for an automatic cat head in which there is no positive engagement of the clutch parts, thereby allowing operation of the cat head in any position without necessarily decreasing the speed of the draw works.

And still another important object of this invention is to provide an improved friction clutch mechanism for an automatic cat head wherein the clutch is self adjusting to eliminate any need for adjustment until replacement is necessary due to wear.

And a further object of this invention is to provide an improved friction clutch mechanism for an automatic cat head which can be engaged or disengaged at any position of the pull line.

An additional object of this invention is to provide an automatic cat head for a rotary draw works having means incorporated therewith to provide any necessary amount of pull for tightening or loosening joints on pipe.

And still a further object of this invention is to provide an automatic cat head for a rotary draw works provided with a sheave having the cable secured thereto in such a manner that the cable will always pull from the center of the sheave shaft when the cathead pull line is used as a deadline and the pull is from the opposite end of the line in a reverse direction thereby eliminating considerable strain on the cat head housing.

Other objects and advantages of my invention will be evident from the following detailed description read in conjunction with the accompanying drawings which illustrate one form of my new invention.

In the drawings:

Fig. 1 is a perspective view of the cat head and operating mechanism mounted on a rotary draw works.

Fig. 2 is a fragmentary detail view in perspective showing the yoke connection of the cat head housing to the draw works.

Fig. 3 is a similar view showing the cam lever connected to one end of the brake band.

Fig. 4 is a similar view of the cam lever shown in contact with a shoulder provided on the sheave.

Fig. 5 is a vertical sectional view of the cat head.

Fig. 6 is a perspective view of the clutch cone.

Fig. 7 is a detailed perspective view of the dissembled cat head elements arranged in the order of assembly.

Fig. 8 is a detailed perspective view of the brake band.

Fig. 15 is a sectional view taken on lines 15—15 of Fig. 5 showing the position of the clutch cone springs with the sheave disengaged.

Fig. 16 is a fragmentary elevational view of the cam cylinders with the sheave disengaged.

Fig. 17 is a fragmentary sectional view of the sheave in disengaged position.

Figs. 18, 19 and 20 are views similar to Figs. 15, 16 and 17 respectively, showing the position of the above parts with the sheave in engaging position.

Figure 9:
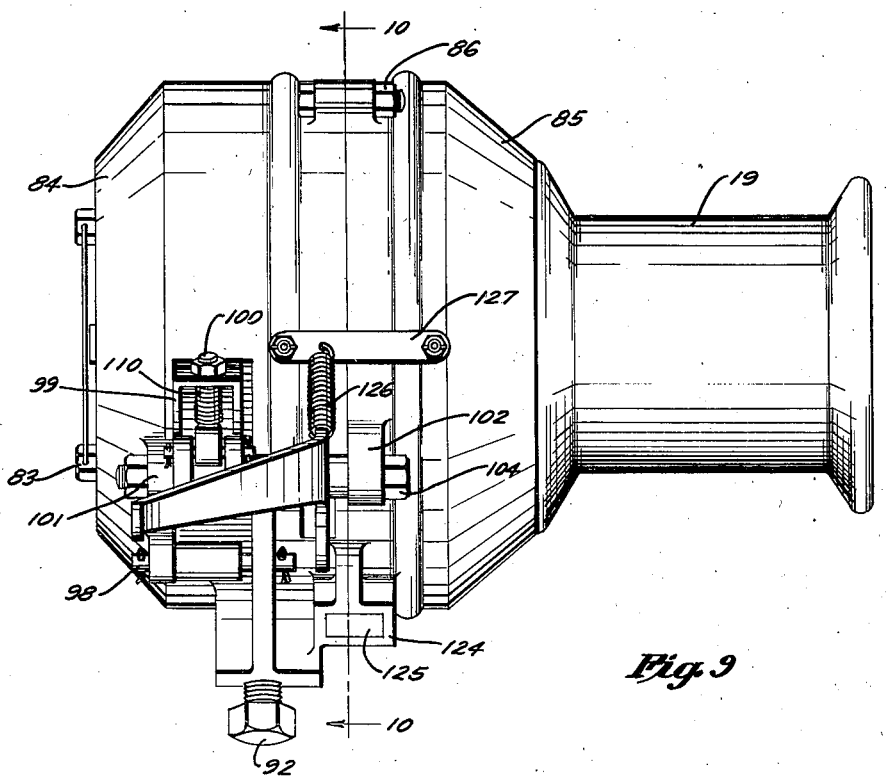
Fig. 9 is a plan view of the cat head showing in detail the arrangement of the control mechanism.

Referring to the drawings in detail and more particularly to Figs. 1, 5 and 7, the derrick equipment of an oil well includes a rotary draw works 2, partially shown in Fig. 1, provided with a line shaft 4 rotatably supported therein. An automatic cat head mechanism is disposed on one end of the line shaft 4, and comprises a spool member 6 formed with a cylindrical bearing 8 adapted to be supported by the rotatable line shaft 4. The bearing 8 is secured to the protruding end of the shaft 4 by a key and slot connection wherein the shaft and the bearing are provided with complementary axial kerfs 10 and 12 adapted to receive a key or pin 14. Longitudinal displacement of the bearing 8 on the shaft 4 is prevented by an annular plate 16 secured to one end of the shaft 4 by a lock nut 18. The end of the shaft 4 is provided with a threaded stud (not shown) for receiving the lock nut 18. The spool 6 is provided with an outer sleeve 19 which can be utilized as an auxiliary wind up unit. The body portion 20 of the spool is provided with an annular flange 22 projecting outwardly at an angle therefrom, and a second flange 24, of substantially frusto-conical shape in spaced relation with the flange 22. Strengthening ribs 25 are provided between the flanges 22 and 24.

Referring to Figs. 5 and 7, the working parts of the automatic cat head are assembled on the bearing member 8. Friction lining 26 is secured by bolts or rivets 28 to one face of the annular flange 22 for a purpose as will be hereinafter set forth. A ball bearing race 30 is disposed on the bearing 8 and supports an annular sheave or pulley member 32. The sheave member 32 is provided with diverging flanges 34 and 36 on the outer periphery of the pulley to form a groove 38 for receiving the pull line or cable as will be hereinafter set forth. A clutch cone 40 is slidably mounted and freely rotatable on the bearing 8 and is provided with a sleeve 42 spaced from and in axial alignment with the cylinder bearing 8. The cone 40 is provided with an annular flange 44 complementary with the pulley flange 34. It will also be understood that the pulley flange 36 is in substantially parallel alignment with the flange 22 of the spool member 6. The flange 44 is adapted to have friction lining 46 secured to one face thereof by bolts or rivets 48. The cone 40 is provided with a plurality of spaced ribs 50 (Fig. 6) disposed between the sleeve 42 and an outer rim portion 52 integral with and extending from the flange 44. The annular outer rim has a recess 54 in which is disposed an annular brake band 56 carrying friction lining 57.

A pair of complementary cylinder members 58 and 60 are freely slidable on the bearing 8 and are disposed adjacent the inner periphery of the sleeve 42. The members 58 and 60 are each provided with a plurality of complementary recesses or grooves 62 for supporting a plurality of discs 64, the purpose of which will be hereinafter explained. The cylinder 58 is provided with a notch 66 for keying it to a projection or lug 68 provided on the clutch cone 40. The cylinder 60 is provided with a notch 70 for keying it to a lug 72 provided on one face of an outer retaining nut 74. The end of bearing 8 is provided with left hand threads for threadedly receiving the retaining nut 74. It will be apparent that the left hand threads are necessary to prevent retrograde movement of the retaining nut since the rotation of the line shaft 4 is normally in a direction as shown by the arrow in Fig. 1.

Referring to Figs. 5, 6, 15 and 19, it is to be noted that the ribs 50 of the clutch cone 40 are each provided with an aperture 76 for receiving a stud member 78. The stud members 78 are of the shape of an arc of a circle and formed at one end with an integral nut 79. The studs 78 are movable in the apertures 76 and are held therein by a nut 80 threaded to one end of the nut 78. A helical spring 81 is disposed on each of the stud members 78 and is anchored between the nut 80 and a rib 50 for a purpose as will be hereinafter set forth. The retaining nut 74 is provided with a plurality of apertures 82 through which extends bolts 83 adapted to be secured in the nuts 79 of the studs 78. It will be apparent from an inspection of Figures 15 and 18 that there are four stud bolts 78 as well as four apertures 82 and four bolts 83 cooperating with the retaining nut 74. Although, as shown in the drawings, four of these units are preferable, it will be understood that any number can be utilized. The bolts 83 cooperating with the nut 79 of the studs 78 provide a direct drive connection between the rotating bearing 8 and the clutch cone 40.

The assembled cat head mechanism described, supra, is encased in a split housing comprising portions 84 and 85 secured together by a plurality of circumferentially spaced bolts 86 (Fig. 9). As clearly shown in Figs. 1 and 2, the housing portion 84 is anchored to a projecting arm 87 of the draw works 2 by a yoke connection 88 secured to the arm by a bolt 89. The housing 84 is provided with a bearing 90 having an integral yoke connection 91 for securing the upper end of the yoke 88 by means of a bolt 92.

From the foregoing it will be apparent that the securing of the housing in this manner provides a substantially floating housing so that in a backing up operation of the cat head where it is subjected to unusually heavy pulls, the floating arrangement of the housing will prevent any tremendous strain on the housing tending to distort it out of its normal alignment with the cat head and draw works or disengage it from the arm 87 of the draw works. Each of the housing portions 84 and 85 are provided with lubricant fittings 93 and 94 (Figs. 1 and 5) supplying lubricant to a plurality of ball bearings 95 disposed in complementary recesses 96 provided in the housing portions and the outer periphery of the diverging flanges 34 and 36 of the sheave 32. The securing of the housing portions 84 and 85 to the arm 87 prevents rotation thereof, however, the ball bearings facilitate rotation of the cat head mechanism within the housing portions.

Referring to Figs. 1 to 5 inclusive, and 9, the brake band 56 containing the frictional lining 57 is provided with an apertured bearing 97 supported by a pin 98 anchored in the bearing 90 of the housing portion 84. The band 56 is disposed beneath the housing portion 84 and extends around the circumference of the sleeve 52 and at its opposite end (Fig. 8) is provided with an upstanding jaw 99, having an aperture (not shown) in one portion thereof through which is disposed a bolt 100 (Fig. 3).

The outer periphery of the housing portion 84

(Fig. 9) is provided with a bearing 101 in alignment with a complementary bearing 102 provided on the housing portion 85. A cam lever control mechanism (Fig. 3) comprises a sleeve 103 rotatably supported on a bolt 104 journaled between the bearings 101 and 102. A cam lever 105 and a pair of complementary spaced arms 106 and 107 are rigidly secured to the sleeve 103. A pin 108 is journaled between the arms 106 and 107 and supports an arm 109 having a threaded aperture (not shown) for receiving one end of the bolt 100 and thus providing the connection between the cam lever 105 and one end of the brake band 56 and jaw 99. A helical spring 110 is anchored on the bolt 100 for a purpose as will be hereinafter set forth.

An operating link 111 is secured by a yoke connection 112 to the upper end of the cam lever 105. The opposite end of the link 111 is secured by a yoke 113 to a pivotable bell crank lever 114 connecting the link 111 with a second link 115 which extends to a point (not shown) where it can be conveniently manipulated by an operator through any conventional pedal or lever (not shown).

Alluding further to the construction of sheave 32, Figs. 7, and 10 to 14 inclusive, it will be noted that the groove 38 is provided with a plurality of circumferentially spaced ribs 116 of such construction that they do not contact the cam portion 117 of the lever 105. In lieu of one of the ribs 116 the groove 38 is provided with a pair of substantially rectangular shaped complementary shoulders 118 and 119 having aligned apertures 120 for receiving a pin or bolt 121 pivotally supporting or hinging a cable socket 122. One end of the pull line or cable 123 is secured in the socket by having the end frayed into a large knot so that it may be babbitted or the like, and thus retained in the socket.

From Figs. 9 to 12 inclusive it will be noted that the housing portion 85 is provided with an upstanding jaw 124 in which is disposed a rectangular safety block 125 extending through the jaw into the groove 38 of the sheave 32 in order to limit the rotation of the sheave 32 as will be hereinafter set forth.

*Operation*

In making or breaking up sections of drill pipe, one portion of the cable 123 is fastened to the tong handle (not shown) while the opposite end portion is secured in the cable socket. With the rotation of the line shaft 4, the spool 6, the bearing 8 and the clutch cone 40 are rotating simultaneously with the line shaft 4. However it will be apparent that unless the frictional linings 26 and 46 are engaging the flanges 34 and 36 the sheave will not rotate. In order to engage the sheave and cause simultaneous rotation with the line shaft 3 and thereby rotate the cable 123, for making or breaking up drill pipe sections, the link 115 is moved by the operator to cause downward vertical movement of the link 111 which causes movement of the arm 105 with a simultaneous rotation of the sleeve 103 to pull the arm 109, bolt 100, and jaw 99 towards the fixed end 97 of the brake band 56. It will be apparent that with the ends of the brake band in close relationship there is a braking action of the lining 57 against the outer rim 52 of the cone 40, tending to retard the rotation of the clutch cone 40.

With the retardation of the clutch cone 40 there is a simultaneous retardation of the cylindrical member 58 due to the direct connection provided by the notch 66 and the lug 68. Under normal rotation of the clutch cone without any braking action applied thereto, the disposition of the studs 78 are clearly shown in Fig. 15. However, upon the retardation of cylinder 58 the cylinder 60 is not retarded and due to the direct connection of the cylindrical member 60 with the bearing 8 by the studs 83, it continues rotation at a velocity substantially equivalent to that of the shaft 4. Consequently with the retarded rotation of the clutch cone 40 the studs 83 rotate with the nut 74 to cause movement of the nuts 79 from a position substantially flush with the ribs 50 as disclosed in (Fig. 15) to a position away from the ribs 50 as shown in (Fig. 18). It will be apparent that the latter position of the nuts 79 place the spring 81 under compression. Simultaneous with the springs 81 being placed under compression, and the retarded rotation of cylinder 58 cooperating with the continued rotation of cylinder 60, the discs 64 act as cams to provide an axial thrust (Fig. 19) between the cylinders 58 and 60 moving the cylinder 58 away from the cylinder 60 in a direction toward the sheave 32. This thrust action is due to the discs 64 rolling in the complementary recesses 62 upon the momentary retardation of the cylinder 58. The movement of the cylinder 58 causes a similar movement of clutch cone 40 and sheave 32 to bring the friction linings 26 and 46 into contact with the diverging flanges 34 and 36 of the sheave 32 (Fig. 20).

It will be apparent that as long as the braking action of the brake band 56 is prevalent that the cylinder 58 will remain in the position as shown in (Fig. 19) to cause rotation of the sheave 32. It will be understood that the retardation of the cone 40 and cylinder 58 provides for the engagement of the sheave 32, and that immediately upon engagement, the cone 40 and sheave 32, are permitted to rotate at a speed comparable with that of the line shaft 4.

Figure 10:
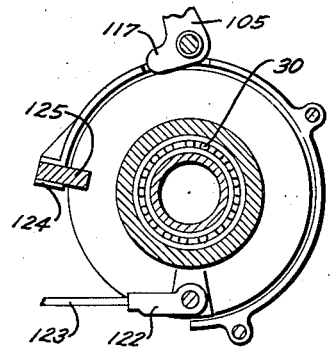
Fig. 10 is a vertical sectional view taken on lines 10—10 of Fig. 9 showing the cable socket at the start of its rotation.
Figure 11:
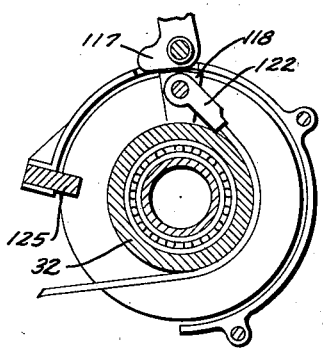
Fig. 11 is a similar view showing the release of the cam lever by the socket.

The rotation of the sheave 32 causes a movement of the cable 123 so that the opposite end portion of the cable fastened to the tong handle (not shown) can be utilized for making or breaking up sections of the pipe. Fig. 10 clearly shows the position of the socket 122 at the start of a forward movement.

As shown in (Fig. 11) when the sheave is rotated to a position where the cable socket 122 is adjacent the cam portion 117, the shoulders 118 and 119 contact the cam 117 to automatically rotate it in a direction away from the sheave, thereby moving the sleeve 104 in a similar direction to separate the ends of the brake band 56, and thus relieve the braking action of the lining 57 against the outer rim 52. The release of the cam lever 105 is assisted by the helical spring 110 and a helical spring 126 anchored between the cam lever 105 and a cross bar 127 supported by the lubricant fittings 93 and 94. Simultaneous with the release of the cam lever 105, the springs 81 having been under compression are immediately placed under tension to cause movement of the clutch cone 40 and the cylindrical member 58 to the position shown in (Fig. 15) wherein the nuts 79 are substantially flush with the ribs 50. With this rotation of the cylindrical member 58 the discs 64 again are moved or rolled in the groove 62 back to the position shown in (Fig. 16), causing a movement of the cylindrical member 58 and clutch cone 40 in a direction toward the retaining nut 74, thereby disengaging the frictional connection of the sheave 32.

Figure 12:
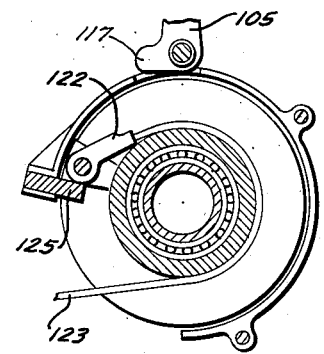
Fig. 12 is a similar view showing the safety block for limiting the rotation of the sheave.
Figure 13:
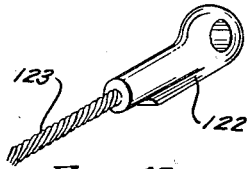
Fig. 13 is a detailed perspective of the cable socket.
Figure 14:
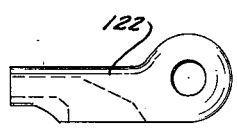
Fig. 14 is an elevational view of the cable socket.

Continued rotation of the sheave 32 due to momentum is prevented by the cable socket contacting the safety block 125, as clearly shown in Fig. 12.

From the foregoing it will be apparent that the cat head construction provides for automatic means wherein the sheave 32 may be engaged or disengaged at any point in the path of its rotation by operation of the cam lever 105. Furthermore the frictional engagement of the sheave 32 with the operating parts of the cat head is such that any positive clutching arrangement is eliminated thereby allowing engagement or disengagement of the sheave regardless of the speed of the rotary draw works engine. This frictional engagement provides an advantage in that for heavier pulls, more pressure can be applied to the control mechanism to create a greater frictional engagement with the sheave 32 to compensate for the increased pull. Furthermore, it will be apparent that the pivotal arrangement of the cable socket in the sheave allows the socket to pivot away from the axis of the sheave shaft and thus eliminate considerable strain on the means securing the cat head housing to the draw works.

Changes may be made in the combination and arrangement of parts as heretofore set forth in the specification and shown in the drawings, it being understood that any modification in the precise embodiment of the invention may be made within the scope of the following claims without departing from the spirit of the invention.

What I claim is:

1. In combination with a rotating shaft of a rotary draw works, a sleeve fixed on one end of the shaft, a sheave encircling the sleeve co-axially therewith, a clutch cone mounted on the sleeve, means for connecting said sleeve and cone for rotation but permitting limited relative movement therebetween, a housing for the sleeve, a brake band disposed between the housing and the clutch cone, a control lever supported by the housing for effecting a braking action of the brake band to retard the rotation of the clutch cone, means cooperating with the clutch cone and sleeve and responsive to the retardation to axially move the clutch cone into engagement with the sheave, friction means on both the sheave and the clutch cone to cause rotation of the sheave with the cone, and means on the sheave for releasing the braking action of the brake band.

2. In combination with a rotating shaft of a rotary draw works, a sleeve fixed on one end of the shaft, a sheave encircling the sleeve co-axially therewith, a clutch cone mounted on the sleeve, means for connecting said sleeve and cone for rotation but permitting limited relative movement therebetween, a housing for the sleeve, a brake band disposed between the housing and the clutch cone, a control lever supported by the housing for effecting a braking action of the brake band to retard the rotation of the clutch cone, a pair of cylinders mounted about the shaft, one of said cylinders connected with the sleeve and the other of said cylinders connected with said clutch cone, said cylinders having means cooperating therewith in response to the retardation of the cone for axially moving the cone into frictional engagement with the sheave to cause rotation of the sheave, and a pair of shoulders provided on the sheave, said shoulders contacting the control lever upon rotation of the sheave to release the braking action of the brake band against the cone.

3. In combination with a rotating shaft of a rotary draw works, a sleeve fixed on one end of the shaft, a sheave encircling the sleeve co-axially therewith, a clutch cone mounted on the sleeve, means for causing rotation of the cone with the sleeve, a housing for the sleeve, a brake band disposed between the housing and the clutch cone, a control lever supported by the housing for effecting a braking action of the brake band to retard the rotation of the clutch cone, said means including cam means cooperating with the clutch cone to axially move the clutch cone into engagement with the sheave upon application of the brake, friction means on both the sheave and the clutch cone to cause rotation of the sheave with the cone when engaging, means on the sheave for releasing the braking action of the brake band, said means causing axial movement of the cone away from the sheave upon release of the braking action.

4. In combination with a rotating shaft of a rotary draw works, a cat head comprising a sleeve fixed on the shaft, a sheave encircling the sleeve and adapted for winding a pull line thereon, a socket member pivotable on the sheave for securing the pull line thereto, a clutch cone slidably mounted on the sleeve and provided with an annular rim, a brake band for engaging said rim, a pair of cylinders disposed about the sleeve, said cylinders having a plurality of complementary recesses for engaging a plurality of discs, means for keying one of the cylinders to the clutch cone, a retaining nut provided on one end of the sleeve, means for keying the other of said cylinders to the retaining nut, a plurality of apertured ribs provided on the clutch cone, a plurality of movable studs supported by the ribs, a spring anchored on each of the studs each of said studs provided with an integral nut, a plurality of bolts extending through the retaining nut and adapted to be secured in the integral nuts to provide a drive connection for rotating the clutch cone simultaneous with the sleeve, a housing member, control means carried by the housing member for effecting a braking action of the brake band against the annular rim to retard rotation of the cone, said retardation causing the discs to roll in the cylinder recesses and convert rotating movement into axial movement for axially moving the clutch cone into frictional engagement with the sheave to cause rotation thereof.

5. In combination with a rotating shaft of a rotary drawn works, a cat head comprising a sleeve fixed on the shaft, a sheave encircling the sleeve and adapted for winding a pull line thereon, a socket member pivotable on the sheave for securing the pull line thereto, a clutch cone slidably mounted on the sleeve and provided with an annular rim, a brake band for engaging said rim, a pair of cylinders disposed about the sleeve, said cylinders having a plurality of complementary recesses for engaging a plurality of discs, means for keying one of the cylinders to the clutch cone, a retaining nut provided on one end of the sleeve, means for keying the other of said cylinders to the retaining nut, a plurality of apertured ribs provided on the clutch cone, a plurality of movable studs supported by the ribs, a spring anchored on each of the studs, each of said studs provided with an integral nut, a plurality of bolts extending through the retaining nut and adapted to be secured in the integral nuts to provide a drive connection for rotating the clutch cone simultaneous with the sleeve, a housing member, control means carried by the housing member for effecting a braking action of the brake band against the annular rim to retard rotation of the cone, said retardation causing the discs to roll in the cylinder recesses and convert rotating movement into axial movement for axially moving the clutch cone into frictional engagement with the sheave to cause rotation thereof, and means on the sheave for releasing the braking action of the brake band.

6. In combination with a rotating shaft of a rotary draw works, a spool comprising a bearing fixed on the shaft and rotating therewith, an annular clutch face provided on said spool, a sheave adapted to be slidable on the bearing, a pair of diverging flanges provided on the sheave, a clutch cone slidable on the bearing, said cone having a sleeve disposed in spaced relation to the bearing, a clutch face provided on the cone, an annular rim provided on the cone, a brake band having friction lining adapted to cooperate with the rim, a pair of cylinders disposed between the bearing and the cone sleeve, said cylinders having a plurality of discs, means for keying one of the cylinders to the cone, a retaining nut provided on one end of the bearing, means for keying the other of said cylinders to the retaining nut, a plurality of apertured ribs provided on the cone, a plurality of arc shaped studs supported by the apertured ribs, each of said studs provided with an integral threaded member, a spring anchored on each of the studs, a plurality of apertures in the retaining nut, each of said apertures adapted to receive a threaded stud cooperating with a threaded member of the arc shaped studs to provide a drive connection for rotating the clutch cone with the bearing member, a split housing member, control means carried by the housing member and effecting a braking action of the brake band to retard the rotation of the clutch cone, said retardation causing the discs to roll in the cylinders to cause an axial movement of the clutch cone and the sheave, whereby one of the diverging flanges frictionally engages the clutch face provided on the spool simultaneous with the clutch face on the cone frictionally engaging the other of said flanges to cause rotation of the sheave with the shaft.

7. In an automatic cat head comprising a bearing sleeve adapted to be mounted on a rotatable line shaft of a draw works, a sheave encircling the sleeve co-axially therewith, a clutch member mounted on the sleeve adjacent the sheave, means for connecting said sleeve and member for rotation but permitting limited relative movement therebetween, brake means engaging the clutch member for retarding the rotation thereof, and means responsive to the retardation of the clutch member for axially shifting said member into frictional engagement with the sheave.

8. In an automatic cat head comprising a bearing sleeve adapted to be mounted on a rotatable line shaft of a draw works, a sheave encircling the sleeve co-axially therewith, a clutch member mounted on the sleeve adjacent the sheave, means for connecting said sleeve and member for rotation but permitting limited relative movement therebetween, brake means engaging the clutch member for retarding the rotation thereof, means responsive to the retardation of the clutch member for axially shifting said member into frictional engagement with the sheave, and means provided on the sheave for releasing the brake means.

9. In an automatic cat head comprising a bearing sleeve adapted to be mounted on a rotatable line shaft of a draw works, a sheave encircling the sleeve, a clutch member mounted on the sleeve in proximity of the sheave, means for connecting said sheave and member for rotation but permitting limited relative movement therebetween, a brake band encircling the member, means effecting a braking action of the brake band against the member to retard the rotation thereof, a pair of cylinders mounted on the sleeve and having a plurality of complementary grooves for engaging a plurality of discs, one of said cylinders connected to the member and the other of said cylinders connected to the first mentioned means, said cylinders responsive to the retardation of the clutch member to cause the discs to move one of said cylinders axially for moving the clutch member into frictional engagement with the sheave.

10. In an automatic cat head comprising a bearing sleeve, adapted to be mounted on a rotatable line shaft of a draw works, a sheave encircling the sleeve, a clutch cone mounted on the sleeve means for connecting said sleeve and cone for rotation but permitting limited relative movement therebetween, a brake band encircling the cone, means effecting a braking action of the brake band against the cone to retard the rotation thereof, a pair of cylinders mounted on the sleeve, one of said cylinders connected with said sleeve and the other connected with said cone, said cylinders having means cooperating therewith in response to the retardation for converting rotary movement into axial movement for axially moving the clutch cone into frictional engagement with the sheave.

11. In combination with a rotating shaft, a member supported by and rotating with the shaft, a sheave slidable on the member, means slidable on the member adapted to cooperate with the sheave, means for connecting the first mentioned means with said member for rotation but permitting limited relative movement therebetween, a brake band encircling the first mentioned means, a control lever for effecting a braking action of the brake band to retard the rotation of the first mentioned means, means cooperating with the first mentioned means in response to retardation to effect an axial movement of the first mentioned means into engagement with the sheave, and means provided on the sheave for releasing the control lever.

12. In combination with a rotating shaft of a rotary draw works, a sleeve fixed on one end of the shaft, a sheave encircling the sleeve co-axially therewith, a clutch cone mounted on the sleeve, means for connecting said sleeve and cone for rotation but permitting limited relative movement therebetween, a housing for the sleeve, a brake band disposed between the housing and the clutch cone, a control lever supported by the housing for effecting a braking action of the brake band to retard the rotation of the clutch cone, a pair of cylinders mounted on the sleeve, one of said cylinders connected with said sleeve and the other connected with said clutch cone, said cylinders having means cooperating therewith in response to the retardation of the cone for axially moving the cone into frictional engagement with the sheave for causing rotation thereof.

WALTER BRAUER.